US011989863B2

(12) United States Patent
Wang

(10) Patent No.: US 11,989,863 B2
(45) Date of Patent: May 21, 2024

(54) METHOD AND DEVICE FOR PROCESSING IMAGE, AND STORAGE MEDIUM

(71) Applicant: BEIJING XIAOMI PINECONE ELECTRONICS CO., LTD., Beijing (CN)

(72) Inventor: Hanmo Wang, Beijing (CN)

(73) Assignee: BEIJING XIAOMI PINECONE ELECTRONICS CO., LTD., Beijing (CN)

(*) Notice: Subject to any disclaimer, the term of this patent is extended or adjusted under 35 U.S.C. 154(b) by 272 days.

(21) Appl. No.: 17/389,995

(22) Filed: Jul. 30, 2021

(65) Prior Publication Data
US 2022/0230283 A1 Jul. 21, 2022

(30) Foreign Application Priority Data
Jan. 21, 2021 (CN) .......................... 202110080892.0

(51) Int. Cl.
*G06K 9/00* (2022.01)
*G06T 5/40* (2006.01)
(Continued)

(52) U.S. Cl.
CPC ................. *G06T 5/80* (2024.01); *G06T 5/40* (2013.01); *G06T 5/50* (2013.01);
(Continued)

(58) Field of Classification Search
CPC . G06T 2207/10144; G06T 5/006; G06T 5/50; G06T 2207/20224; G06T 5/002;
(Continued)

(56) References Cited

U.S. PATENT DOCUMENTS

| 11,094,039 B1* | 8/2021 | Wong ........................ G06T 5/50 |
| 11,669,939 B1* | 6/2023 | Ferrés ....................... G06T 5/50 |
| | | 382/167 |

(Continued)

FOREIGN PATENT DOCUMENTS

| CN | 106027851 A | 10/2016 |
| CN | 109565547 A | 4/2019 |

(Continued)

OTHER PUBLICATIONS

Mertens, T., et al., "Exposure fusion: A simple and practical alternative to high dynamic range photography", Computer Graphics Forum, Oxford, vol. 28, No. 1, 2009, (11p).

(Continued)

*Primary Examiner* — Emily C Terrell
*Assistant Examiner* — Kevin M Coomber
(74) *Attorney, Agent, or Firm* — Arch & Lake LLP

(57) ABSTRACT

An image processing method, a device and a non-transitory computer-readable storage medium thereof are provided. The method includes that a first image of a target object, a second image of the target object, and a third image of the target object are acquired. Exposure of the first image is less than exposure of the second image. The exposure of the second image is less than exposure of the third image. Further, brightness of the first image is increased to acquire a fourth image. Moreover, ghost elimination is performed on the second image and the fourth image is taken as a first reference frame to acquire a second reference frame. Furthermore, ghost elimination is performed on the third image based on the second reference frame to acquire a fifth image.

15 Claims, 15 Drawing Sheets

(51) Int. Cl.
*G06T 5/50* (2006.01)
*G06T 5/80* (2024.01)

(52) U.S. Cl.
CPC ............ *G06T 2207/10024* (2013.01); *G06T 2207/20221* (2013.01); *G06T 2207/20224* (2013.01)

(58) Field of Classification Search
CPC ............ G06T 5/40; G06T 2207/20221; G06T 2207/20212; G06T 2207/10024; G06T 2207/20208; H04N 23/73; H04N 5/211
See application file for complete search history.

(56) References Cited

U.S. PATENT DOCUMENTS

| | | | |
|---|---|---|---|
| 2016/0093029 | A1 | 3/2016 | Micovic |
| 2016/0292837 | A1 | 10/2016 | Lakemond |
| 2018/0061027 | A1 | 3/2018 | Lakemond |
| 2019/0306399 | A1 | 10/2019 | Fujinami |
| 2020/0160493 | A1 | 5/2020 | Lakemond |
| 2022/0053117 | A1* | 2/2022 | Patel ................ H04N 23/73 |

FOREIGN PATENT DOCUMENTS

| | | | | | |
|---|---|---|---|---|---|
| CN | 109671106 | A | | 4/2019 | |
| CN | 111418201 | A | | 7/2020 | |
| CN | 112104854 | A | * | 12/2020 | ............... G06T 1/20 |
| KR | 20130034186 | A | * | 4/2013 | ............... H04N 9/77 |
| WO | 2019183813 | A1 | | 10/2019 | |
| WO | 2020055196 | A1 | | 3/2020 | |
| WO | WO-2020210472 | A1 | * | 10/2020 | ............. G06T 5/002 |

OTHER PUBLICATIONS

Tursun, Okan Tarhan, et al., "The State of the Art in HDR Deghosting: A Survey and Evaluation", Computer Graphics Forum, vol. 34, No. 2, (2015), (25p).
Coltuc, D., et al., "Exact histogram specification". IEEE Transactions on Image Processing, vol. 15, No. 5, May 2006, (10p).
European Search Report in European application No. 21188425.9, dated Jan. 28, 2022, (17 pages).

* cited by examiner

S1031, the brightness of the first image may be adjusted, acquiring the fourth image with brightness differing from brightness of the second image by a difference less than a preset threshold

FIG. 1B

An adjustment coefficient for adjusting the brightness of the first image may be determined according to exposure parameters of the first image and the second image. An exposure parameter may include an exposure duration and/or an exposure aperture size — S103A The brightness of the first image may be increased according to the adjustment coefficient, acquiring the fourth image — S103B

FIG. 1C

The fourth image and the second image may be fused taking the fourth image as the first reference frame, acquiring the second reference frame. A location of the target object in the second reference frame may be identical to a location of the target object in the first image — S1051

The second reference frame and the third image may be fused, acquiring the fifth image. A location of the target object in the fifth image may be identical to the location of the target object in the first image — S1071

FIG. 1D

S10711, the second reference frame and the third image in the YUV format may be converted into the second reference frame and the third image in the RGB format S10712, histogram matching may be performed on the second reference frame and the third image in the RGB format, and format conversion may be performed on a matching image, acquiring the second reference frame with increased brightness S10713, the third image and the second reference frame with increased brightness may be fused, acquiring the fifth image

FIG. 1G

S107121, histogram equalization may be performed on the second reference frame in the RGB format, acquiring a first equalized image. Histogram equalization may be performed on the third image in the RGB format, acquiring a second equalized image S107122, a first cumulative distribution function corresponding to the first equalized image and a second cumulative distribution function corresponding to the second equalized image may be determined S107123, matching may be performed on the first cumulative distribution function and the second cumulative distribution function

FIG. 1H

METHOD AND DEVICE FOR PROCESSING IMAGE, AND STORAGE MEDIUM

CROSS-REFERENCE TO RELATED APPLICATIONS

This application is based upon and claims priority to Chinese Patent Application No. 202110080892.0, filed on Jan. 21, 2021, the contents of which are incorporated herein by reference in their entireties for all purposes.

TECHNICAL FIELD

The present disclosure relates to the field of image technology, and more particularly, to a method and device for processing an image, and a storage medium.

BACKGROUND

When collecting an image in a high dynamic scene, of a moving object such as a waving or shaking person, due to an interval between exposure frames in collection, there may often be a ghost where the moving object is located on the image collected, impacting overall perception. At present, a ghost is eliminated, either by adding information missing in a moving part by attaching information on an underexposed frame to a collected image, which often causes a problem such as image blurring, loss of information, excessive noise, etc.; or by throwing away some highlight information in the detected moving part, in which case although there is no ghost, much dynamic information is lost.

SUMMARY

The present disclosure provides a method and device for processing an image, and a storage medium.

According to a first aspect of the present disclosure, there is provided a method for processing an image. The method includes acquiring a first image of a target object, a second image of the target object, and a third image of the target object, where exposure of the first image is less than exposure of the second image, where the exposure of the second image is less than exposure of the third image. Additionally, the method includes acquiring a fourth image by increasing brightness of the first image. Furthermore, the method includes acquiring a second reference frame by performing ghost elimination on the second image and taking the fourth image as a first reference frame. Moreover, the method includes acquiring a fifth image by performing ghost elimination on the third image based on the second reference frame.

According to a second aspect of the present disclosure, there is provided a device for processing an image. The device includes a processor and a memory configured to store processor executable instructions.

Further, the processor is configured to acquire a first image of a target object, a second image of the target object, and a third image of the target object, where exposure of the first image is less than exposure of the second image, where the exposure of the second image is less than exposure of the third image. Moreover, the processor is configured to: acquire a fourth image by increasing brightness of the first image, acquire a second reference frame by performing ghost elimination on the second image and taking the fourth image as a first reference frame, and acquire a fifth image by performing ghost elimination on the third image based on the second reference frame. According to a third aspect of the present disclosure, there is provided a non-transitory computer-readable storage medium having stored therein computer-executable instructions which, when executed by a processor, implement steps in any method according to the first aspect.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate embodiments consistent with the present disclosure and, together with the description, serve to explain the principles of the present disclosure.

FIG. 1B is a flowchart of a method for processing an image according to an example.

FIG. 1C is a flowchart of a method for processing an image according to an example.

FIG. 1D is a flowchart of a method for processing an image according to an example.

FIG. 1G is a flowchart of a method for processing an image according to an example.

FIG. 1H is a flowchart of a method for processing an image according to an example.

DETAILED DESCRIPTION

Figure 1A:
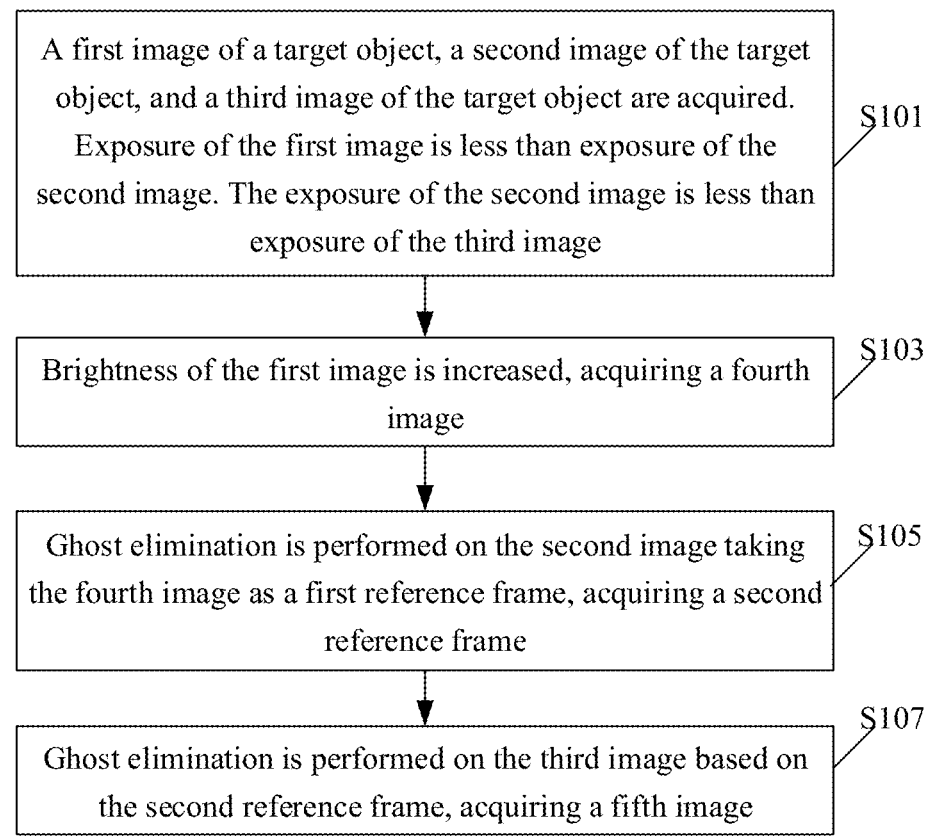
FIG. 1A is a flowchart of a method for processing an image according to an example.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following examples do not represent all implementations in accordance with the present disclosure. Rather, they are merely examples of the apparatus and method in accordance with certain aspects herein as recited in the accompanying claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

It should be noted that, due to hardware limitation, it is difficult to cover, with a single photo, all brightness of a scene, such as a backlight scene, where a subject to be photographed often appears fairly dark. To solve the problem of photography in a scene of a large light ratio, a High Dynamic Range (HDR) collecting mechanism is provided in the field of image acquisition or collection. With the HDR collecting mechanism, Low-Dynamic Range (LDR) images of different brightness of the same scene may be acquired by photographing at different exposures respectively, and then a HDR image may be acquired by synthesizing the three LDR images. A HDR refers to a ratio of a maximum brightness to a minimum brightness of an image. The greater a dynamic range is, the more scene details an image displays, and the more realistic a visual effect is.

Thus, a detail of a dark part may be seen in a bright image, content of a bright region may be seen in a dark image, and content of a region of intermediate brightness may be retained by an image of normal brightness, so that a synthesized HDR image may better reflect the visual effect in a real environment, providing a greater dynamic range and more image details. However, when there is a moving object in a photographing scene, as there is a time difference in acquisition time of each image, when synthesizing these images, the moving object may generate a ghost in a synthesized image, impacting appearance of the image and user experience.

To better eliminate a ghost, embodiments of the present disclosure provide a method for processing an image. FIG. 1A is a flowchart of a method for processing an image according to an example. As shown in FIG. 1A, the method for processing an image includes steps as follows.

In S101, a first image of a target object, a second image of the target object, and a third image of the target object are acquired. Exposure of the first image is less than exposure of the second image. The exposure of the second image is less than exposure of the third image.

In S103, brightness of the first image is increased, acquiring a fourth image.

In S105, ghost elimination is performed on the second image taking the fourth image as a first reference frame, acquiring a second reference frame.

In S107, ghost elimination is performed on the third image based on the second reference frame, acquiring a fifth image.

It should be noted that the method for processing an image may be applied to a mobile terminal provided with an image acquisition device, and the mobile terminal may be a smartphone, a tablet computer, wearable electronic equipment, etc.

The image acquisition device generally refers to a device capable of performing a photographing function in a mobile terminal. The device includes a camera, a processing module and a storage module necessary for acquiring and transmitting an image, and may further include some processing functional modules.

An image acquisition device may be a camera or a video camera, etc.

A photographing parameter of an image acquisition device may include an exposure aperture size, a photosensitivity of a camera or a video camera, an exposure duration, and of course may also include another performance parameter, etc. An exposure duration refers to an interval from the time when a shutter opens to the time when the shutter closes. The longer an exposure duration, the more light is introduced, which is suitable for a poor light condition. Photosensitivity refers to how sensitive a photosensitive film in an image acquisition device is to light. For an insensitive film, there may have to be a longer exposure duration in order to achieve the same imaging effect as for a sensitive film. An exposure aperture size may be represented by an area of an exposure aperture. The area may be used to control the amount of light transmitted through the lens into the photosensitive surface of the image acquisition device.

The exposure duration, the photosensitivity, and the exposure aperture size may be related to an initial setting and an attribute parameter of the image acquisition device.

In embodiments of the present disclosure, the target object may be a dynamic object that is not stationary. That is, the method for processing an image according to embodiments of the present disclosure is directed at an image acquired by snapping a moving target object.

The target object may be a human, an animal, or a vehicle.

In embodiments of the present disclosure, before executing the method for processing an image, it may be determined whether an acquired image is an image acquired by snapping a moving object.

Here, it may be detected whether an image is an image acquired by snapping a moving object in many ways. For example, motion detection is performed on an image collected. The image may be analyzed. Detection may be performed once every x frames (x is an adjustable positive integer). In each detection, the difference between a current detection frame image and a last detection frame image is determined. Specifically, two adjacent frame images may be divided respectively into a number of regions in the same manner. For example, each image is divided into 64 regions. If there is a large difference in one or more regions, it is deemed that image acquisition is being performed for a moving scene.

In embodiments of the present disclosure, when the image acquisition device of a mobile terminal is in a snapshot mode, a photographing instruction to continuously take three images is received. In S101, three images may be photographed with a present photographing parameter setting.

The first image, the second image, and the third image are all images corresponding to different exposures acquired when image acquisition is performed on the same target object. The exposure of the first image may be less than the exposure of the second image. The exposure of the second image may be less than the exposure of the third image.

Note that the first image, the second image, and the third image are images in the RAW format.

In one embodiment, the first image, the second image, and the third image are multiple images collected continuously by the same camera or video camera, e.g., multiple images collected continuously after the camera turns on the HDR collecting mechanism.

The image in the RAW format is raw RGB data directly output by a sensor after photoelectric conversion and Analog-to-Digital Converter (ADC) sampling, which are data yet to be processed that can better reflect an image feature.

It should be noted that the second image may be an image exposed with exposure within a predetermined exposure range. The exposure is in the predetermined exposure range, indicating that a highlight region in the image is not excessively bright or excessively dark. Thus, the second image is a normally exposed image. Further, the first image is an underexposed image, and the third image is an image of long exposure.

Figure 2:
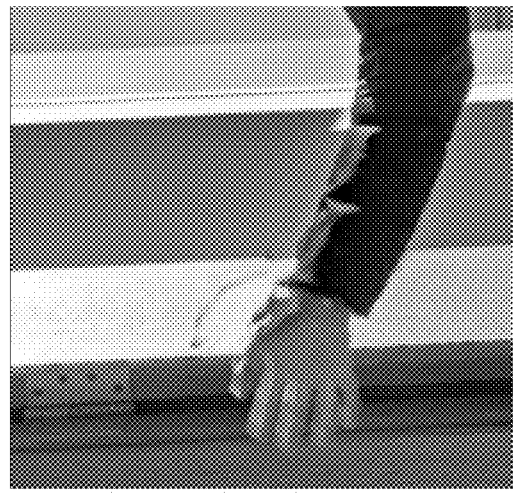
FIG. 2 is a diagram comparing an arm image to a ghost to an arm image with no ghost.
Figure 2:
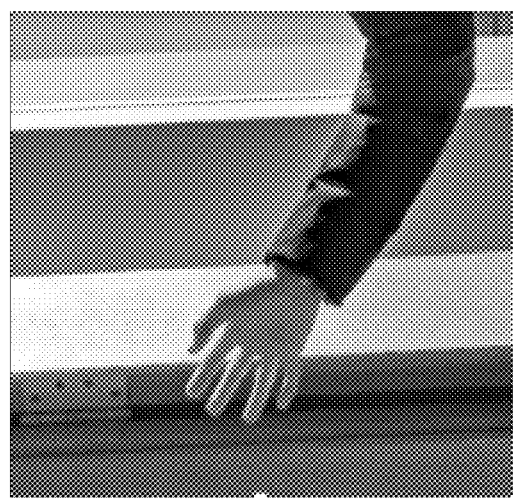

Since the target object is dynamically present, there may be a deviation in the location of the target object in three images acquired when snapping the target object, thereby causing a visual ghost effect. For example, of three consecutive image frames acquired by photographing a swaying arm, the arm may be at an upper location in one image, at a middle location in one image, and at a lower location in another image. Then, there may be a ghost in an image generated by fusing the three images. Specifically, as shown in FIG. 2, in FIG. 2 the image on the left is an arm image with no ghost, and the image on the right is an arm image with a ghost.

In order to eliminate a ghost, the locations of a motion region in the three images have to be adjusted to be the same. When the location of the motion region is kept consistent in the three images, there will be visually no ghost in a target image acquired by fusion.

Here, the motion region in the three images is a region in which the moving target object is located. For example, in an image generated by performing image acquisition on a swaying arm, the region in which the arm is located is the motion region.

Specifically, when adjusting the location of the motion region in the three images, with the present disclosure, the first image may be taken as a reference frame to implement ghost elimination for another image. That is, with reference to the location of the motion region in the first image, locations in other images may be adjusted to be identical to or substantially the same as the location of the motion region in the first image, so that the synthetic image is visually free of ghost.

Figure 3:
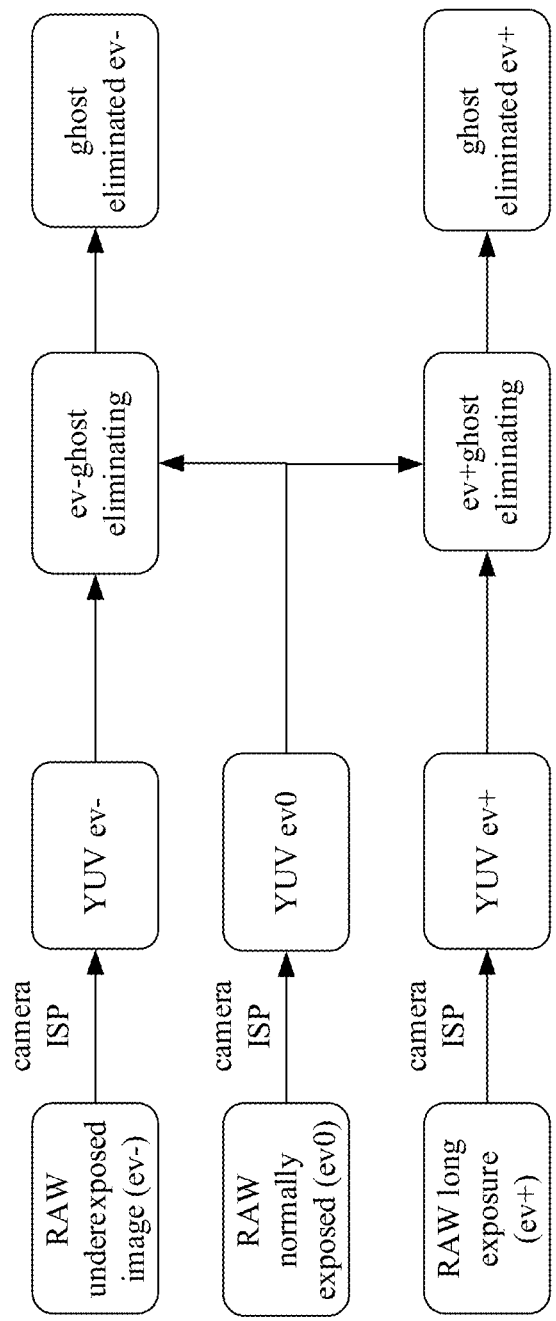
FIG. 3 is a flowchart of a method for eliminating a ghost.

It is to be noted that in a highlight region in a normally exposed image, there may be an overexposed region with respect to an underexposed image, as shown in FIG. 3. FIG. 3 is a flowchart of a method for eliminating a ghost. In FIG. 3, three images of different exposures are taken in the RAW domain. The three images of different exposures are respectively processed by an image signal processor (ISP) of the camera, acquiring images in the YUV format corresponding to the three images. The ghost eliminating operation is performed on the underexposed image ev− and the long-exposure image ev+, respectively, using the normally exposed image ev0 as a reference frame. With this method of ghost elimination, there tends to be a ghost when there is a moving object in an overexposed region of the ev0.

Then, in order to minimize the presence of an overexposed region, with examples of the present disclosure, locations of the target object in the three images may be adjusted using the underexposed image (i.e., the first image) as a reference frame. A ghost may be eliminated when locations of the target object in the three images coincide. In addition, in this case, possibility of occurrence of an overexposed region is small, rendering better image perception.

It should be noted that being an underexposed image, the first image deviates from the other images in brightness. With embodiments of the present disclosure, before performing ghost elimination on the second image using the first image, brightness of the first image is increased, acquiring a fourth image. Ghost elimination may be performed on the second image using the fourth image as a first reference frame. In this way, on one hand, ghost elimination is performed on the second image using the image with increased brightness, which is more convenient in terms of processing and adjustment. On the other hand, the image with increased brightness may retain more image details. In addition, in image processing, a bright image is deemed to be of low noise, and the alignment may be more accurate by taking the first image of increased brightness as the reference image.

Here, ghosting elimination may include fusion processing. That is, the fourth image and the second image may be fused to eliminate any ghost in the fused image.

Since by the ghost eliminating operation, locations of the motion region in the three images are adjusted to be the same, after processing, the location of the motion region in the second reference frame coincides with the location of the motion region in the first frame image.

After performing ghost elimination on the second image, acquiring the second reference frame, ghost elimination continues to be performed on the third image based on the second reference frame. In this way, after the ghost eliminating operation, the location of the motion region in the fifth image coincides with the location of the motion region in the second reference frame. Since the motion region in the second reference frame coincides with the location of the motion region in the first image, locations of the target object in the second reference frame and in the fifth image are both consistent with the location of the target object in the first image.

It should be noted that in embodiments of the present disclosure, ghost elimination is performed on the third image based on the second reference frame generated after ghost elimination, improving processing precision based on the feature that the brightness of the second reference frame is closer to brightness of the third image. In addition, in fusion, the fifth image is made closer to the second reference frame, so that the locations of the target object in the three images may be closer.

In this way, since ghost elimination is performed using the first image with increased brightness (i.e., the fourth image) as the reference frame, and the first image is an image of low exposure, it is possible to significantly improve occurrence of a ghost in existence of a moving object in an overexposed region when ghost elimination is performed with normal exposure as the reference frame, effectively eliminating a ghost in the image. Further, the first image with increased brightness may retain more image details, improving loss of information during ghost elimination.

FIG. 1B is a flowchart of a method for processing an image according to an example. In some embodiments, in S103, the brightness of the first image may be increased, acquiring the fourth image, as follows, as shown in FIG. 1B.

In S1031, the brightness of the first image may be adjusted, acquiring the fourth image with brightness differing from brightness of the second image by a difference less than a preset threshold.

In embodiments of the present disclosure, ghost elimination is performed on the second image using the fourth image acquired by increasing the brightness as the first reference frame. In order to facilitate ghost elimination, the brightness of the first image may be increased to differ from brightness of the second image by a difference less than a preset threshold.

Here, when the brightness is increased to differ from brightness of the second image by a difference less than a preset threshold, the brightness of the fourth image and the second image are visually the same. As such, the preset threshold may be determined based on human eye perception. For example, when the difference in brightness of two images is less than a number, the brightness perceived by the human eye is the same.

When the brightness of the fourth image and the second image are slightly different or equal, in image fusion, it is possible to consider just a single variable, reducing processing complexity in image fusion, or reducing a fusion error brought about by different image brightness.

FIG. 1C is a flowchart of a method for processing an image according to an example. In some embodiments, the brightness of the first image may be increased, acquiring the fourth image, as follows, as shown in FIG. 1C.

In S103A, an adjustment coefficient for adjusting the brightness of the first image may be determined according to exposure parameters of the first image and the second image. An exposure parameter may include an exposure duration and/or an exposure aperture size.

In S103B, the brightness of the first image may be increased according to the adjustment coefficient, acquiring the fourth image.

Here, the brightness of the first image may be increased according to the adjustment coefficient, acquiring the fourth image, as follows. The brightness of the first image may be adjusted based on the adjustment coefficient, acquiring the fourth image.

It should be noted that the difference in brightness of the fourth image and the second image may be smaller than the preset threshold, but is not limited as such.

In examples of the present disclosure, in order to adjust the brightness of the first image to be the same as the brightness of the second image, or to differ from the brightness of the second image by a difference less than a preset threshold, an adjustment coefficient may be determined by the exposure parameters of the first image and the second image, and the brightness of the first image may be adjusted through the adjustment coefficient, acquiring a fourth image with brightness differing from brightness of the second image by a difference less than the preset threshold.

An exposure duration is the interval from the time when a shutter opens to the time when the shutter closes. Different exposure durations correspond to different image exposures. The longer an exposure duration, the more light is introduced in image acquisition, and the greater the exposure of the acquired image is. Correspondingly, the shorter an exposure duration, the less light is introduced in image acquisition, and the smaller the exposure of the acquired image is.

The exposure aperture size may be represented by the aperture area of the image acquisition device. The greater the exposure aperture size, the more light is introduced during image acquisition, and the greater the exposure of the acquired image is. Correspondingly, the less the exposure aperture size, the less light is introduced during image acquisition, and the less the exposure of the acquired image is.

Here, the adjustment coefficient for adjusting the brightness of the first image may be determined according to exposure parameters of the first image and the second image as follows.

The adjustment coefficient for adjusting the brightness of the first image may be determined according to the ratio of the exposure duration of the first image to the exposure duration of the second image.

In some embodiments, the adjustment coefficient may be computed as:

$$x = Gain_0 * ExpTime_0 / (Gain\_ * ExpTime\_)$$

The $ExpTime_0$ represents the exposure duration when the second image is acquired. The $ExpTime\_$ represents the exposure duration when the first image is acquired. The $Gain_0$ represents a gain of the image acquisition device that collects the second image. The $Gain\_$ represents a gain of the image acquisition device that collects the first image. The $Gain_0$ and the $Gain\_$ are preset values that may be determined according to a photographing parameter and a photographing scene of an image acquisition device. The gain differs corresponding to different types of image acquisition devices, as well as to the same type of image acquisition device in different application scenes.

After the adjustment coefficient X has been determined, the brightness of the first image may be adjusted based on the adjustment coefficient, acquiring the fourth image with brightness differing from brightness of the second image by a difference less than a preset threshold, as follows. The fourth image may be acquired based on a product of a pixel in the first image and the adjustment coefficient.

Since the brightness of the first image is increased, the image of increased brightness may retain more image details.

FIG. 1D is a flowchart of a method for processing an image according to an example. In some embodiments, ghost elimination is performed on the second image taking the fourth image as the first reference frame, acquiring the second reference frame, as follows, as shown in FIG. 1D.

In S1051, the fourth image and the second image may be fused taking the fourth image as the first reference frame, acquiring the second reference frame. A location of the target object in the second reference frame may be identical to a location of the target object in the first image.

Here, there may be a deviation in the location of the target object in three images acquired when snapping the target object, thereby causing a visual ghost effect. In order to eliminate a ghost, the locations of a motion region in the three images have to be adjusted to be the same. When the location of the motion region is kept consistent in the three images, there will be visually no ghost in a target image acquired by fusions.

Then, the ghost eliminating processing is an operation of adjusting the location of the target object in the second image. In embodiments of the present disclosure, the location of the target object in the image is specifically adjusted through image fusion.

Thus, a ghost may be eliminated as follows. The fourth image and the second image may be fused taking the fourth image as the first reference frame, acquiring the second reference frame. Thus, after fusion, the location of the target object in the second reference frame is identical to the location of the target object in the first image.

Ghost elimination may be performed on the third image based on the second reference frame, acquiring the fifth image, as follows, as shown in FIG. 1D. In S1071, the second reference frame and the third image may be fused, acquiring the fifth image. That is, image fusion may be performed on the third image using the second reference frame, acquiring the fifth image. In this way, after the fusion, the location of the target object in the fifth image may be identical to the location of the target object in the first image.

In this way, after the ghost eliminating operation, the location of the motion region in the fifth image coincides with the location of the motion region in the second reference frame. Since the motion region in the second reference frame coincides with the location of the motion region in the first image, the target object is located at the same location in the first image, the second image, and the third image after ghost elimination.

The image fusion includes alignment and fusion of image pixels. The alignment and fusion may be implemented by measuring a deviation of an image to be processed from a reference image, etc. Here, the reference image is the fourth image. The image to be processed is the second image as well as the third image.

Here, a difference image may be acquired based on a deviation of the image to be processed from the reference image. Further, the weight of a pixel may be determined based on the difference image. Image fusion may be performed between the image to be processed and the reference image based on the weight.

Ghost eliminating processing, that is, alignment and fusion of image pixels, is elaborated below.

Figure 1E:
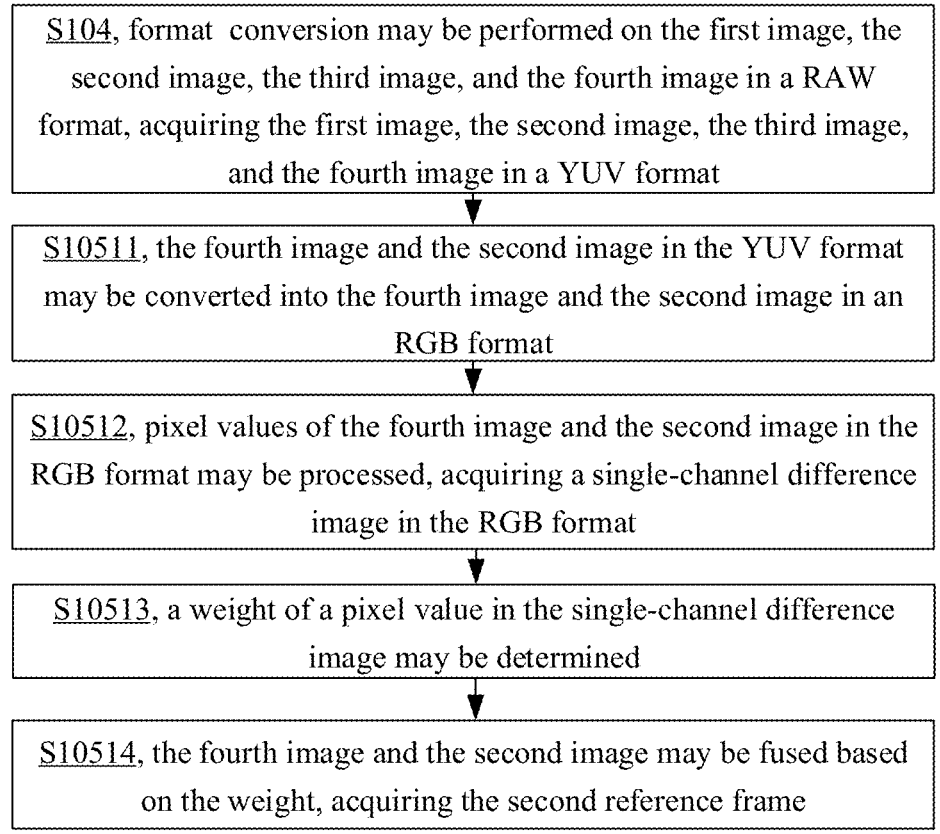
FIG. 1E is a flowchart of a method for processing an image according to an example.

FIG. 1E is a flowchart of a method for processing an image according to an example. Before performing ghost elimination, the method further includes a step as follows.

In S104, format conversion may be performed on the first image, the second image, the third image, and the fourth image in a RAW format, acquiring the first image, the second image, the third image, and the fourth image in a YUV format.

In embodiments of the present disclosure, in order to facilitate image processing, the image fusion is performed in the YUV format. Thus, the first image, the second image, the third image, and the fourth image may first be converted from a RAW format to a YUV format.

Here, the format conversion may be performed directly based on the image signal processor (ISP) in the image acquisition device.

After conversion to the YUV format, the fourth image and the second image may be fused taking the fourth image as the first reference frame, acquiring the second reference frame, as follows, as shown in FIG. 1E.

In S10511, the fourth image and the second image in the YUV format may be converted into the fourth image and the second image in an RGB format.

In S10512, pixel values of the fourth image and the second image in the RGB format may be processed, acquiring a single-channel difference image in the RGB format.

In S10513, a weight of a pixel value in the single-channel difference image may be determined.

In S10514, the fourth image and the second image may be fused based on the weight, acquiring the second reference frame.

In embodiments of the present disclosure, the fourth image and the second image are fused according to the determined weight, acquiring a second reference frame. Specifically, the fourth image and the second image in the YUV format are first converted into the fourth image and the second image in the RGB format; image fusion is performed based on the fourth image and the second image in the RGB format.

In an image in the YUV format, Y represents brightness, and U and V represent chromaticity. An image with only Y is black and white. A color image further has UV. RGB is a standard representing colors in the digitization field, also referred to as a color space. Pixel values in an image in the RGB format are represented by three components R, G, and B. A particular color is represented by a combination of different brightness of the three primary colors R, G, and B. If each component is represented by 8 bits, one pixel is represented by a total of 3*8=24 bits. Both YUV and RGB are used to express color. However, YUV and RGB describe color in different ways. With RGB, a color is split into a brightness combination of three pure colors, and with YUV, a color is split into a combination of one brightness and two chromaticity.

The fourth image and the second image may be fused based on the weight as follows. An RGB value of the second image may be mixed respectively with an RGB value of the fourth image according to a proportion, ultimately acquiring a mixed RGB value. Thus, the fourth image and the second image may be fused based on the weight, acquiring the second reference frame, as follows.

$$RGB1=(w*RGB\_)+(1-w)*RGB_0$$

The RGB1 is the second reference frame. The w is the weight of a pixel value in the difference image. The RGB_ is the fourth image. The $RGB_0$ is the second image.

Here, in order to make the fused second reference frame closer to the first image, during fusion, a pixel value in the first image may be of a greater weight. In this way, it is ensured as much as possible that the fused second reference frame is closer to the first image, and then the motion regions of the second image and the first image are kept as consistent as possible.

Here, the weight of a pixel value in the single-channel difference image may be determined as follows.

The weight of a pixel value in the single-channel difference image may be determined based on a preset first threshold and a preset second threshold.

Specifically, each pixel value in the single-channel difference image may be compared with the set first threshold and the set second threshold, and the weight of a pixel value in the single-channel difference image may be determined based on the comparison result.

For example, the first threshold is thre1 and the second threshold is thre2, and the weight W (x, y) of a pixel value in the single-channel difference image diff (x, y) may be as follows.

When diff (x, y)<thre1 the weight W(x, y)=0
When diff (x, y)>thre2, the weight W(x, y)=1
When thre1≤diff (x, y)≤thre2

$$W(x,y)=(diff(x,y)-thre1)/(thre2-thre1)$$

Here, the diff (x, y) is the pixel value at the location (x, y) in the single-channel difference image. In an image matrix of the fourth image and the second image, the location of a pixel is represented by the ordinate and abscissa (x, y). The W (x, y) is the weight of a pixel value. For example, if the image is a 3×2 matrix, that is, containing six pixel values, weights may be determined respectively for the six pixel values.

Thus, the second reference frame may be acquired by fusion by summing over product of a pixel value at a location and the weight corresponding to the pixel value in the two images.

Figure 1F:
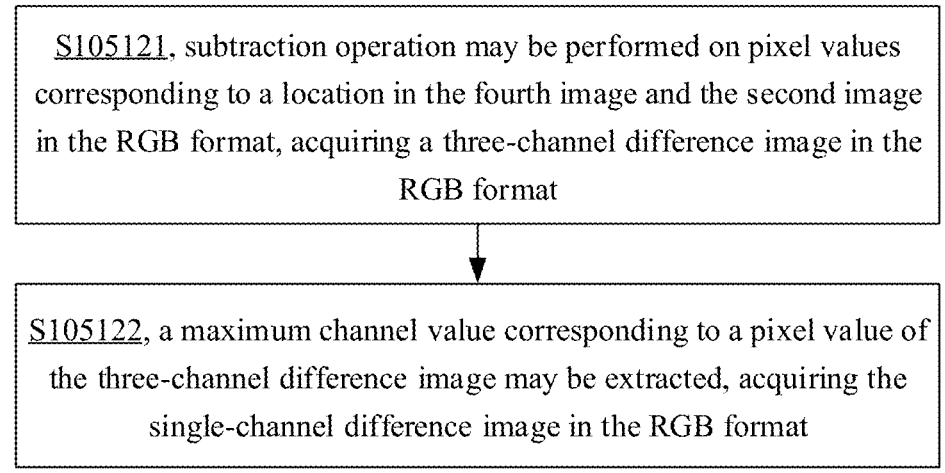
FIG. 1F is a flowchart of a method for processing an image according to an example.

FIG. 1F is a flowchart of a method for processing an image according to an example. In some embodiments, the pixel values of the fourth image and the second image in the RGB format may be processed, acquiring the single-channel difference image in the RGB format, as follows, as shown in FIG. 1F.

In S105121, subtraction operation may be performed on pixel values corresponding to a location in the fourth image and the second image in the RGB format, acquiring a three-channel difference image in the RGB format.

In S105122, a maximum channel value corresponding to a pixel value of the three-channel difference image may be extracted, acquiring the single-channel difference image in the RGB format.

In embodiments of the present disclosure, a three-channel difference image is generated in the RGB format.

Since the RGB format includes three color channels, when subtraction is performed on the corresponding pixel values at a location in the fourth image and the second image, determining a three-channel difference image, a difference image with respect to a color channel may be acquired. In this case, if the single-channel difference image is generated taking the maximum channel value corresponding to a pixel value of the three-channel difference image, the image may be adjusted toward the maximum difference.

For example, assuming that the three-channel difference image diff $(x, y)_{-3}$ includes three pixel values, i.e., a pixel value A (155, 120, 200), a pixel value B (20, 60, 223), and a pixel value C (89, 120, 100), then the maximum channel value corresponding to a pixel value of the three-channel difference image may be extracted, respectively, and the acquired single-channel difference image diff (x, y) is an image including three pixel values A (200), B (223), and C (120). Thus, by comparing the pixel value in the single-channel difference image diff (x y) to the preset first threshold and the preset second threshold, it is possible to determine a weight to be adjusted for each pixel value. The weight represents a degree to which the image is adjusted toward a maximum difference.

Thus, fusion may be implemented based on the weight, adjusting the target object in the second image to the location of the target object in the first image.

FIG. 1G is a flowchart of a method for processing an image according to an example. In some embodiments, the second reference frame and the third image may be fused, acquiring the fifth image, as follows, as shown in FIG. 1G.

In S10711, the second reference frame and the third image in the YUV format may be converted into the second reference frame and the third image in the RGB format.

In S10712, histogram matching may be performed on the second reference frame and the third image in the RGB format, and format conversion may be performed on a matching image, acquiring the second reference frame with increased brightness.

In S10713, the third image and the second reference frame with increased brightness may be fused, acquiring the fifth image.

Here, histogram matching refers to an image enhancing method in which a histogram of an image is turned into a histogram of a specified shape by specifying a histogram shape. A histogram shape may have to be selected first, that is, a histogram of an image is selected as a reference object for matching. Then, a target image is matched, via a mapping function, to the reference object designated, acquiring a histogram of the same shape as the histogram shape of the reference object.

Here, through histogram matching, the second reference frame in the RGB format may be made to be close to the third image in terms of the histogram, so that the two images have similar hue and contrast.

When the brightness of the second reference frame in the RGB format and the brightness of the third image are not quite the same, by performing histogram matching on the second reference frame in the RGB format and the third image, impact of different brightness may be eliminated, so that the brightness of the second reference frame in the RGB format and the brightness of the third image are close to each other, further improving the effect of the target image.

In case of reaching the same or similar brightness, the second reference frame with increased brightness and the third image may be fused based on the brightness, acquiring the fifth image.

Here, the second reference frame with increased brightness and the third image may be fused based on the brightness, acquiring the fifth image, as follows. The third image and the second reference frame with increased brightness in the YUV format may be converted into the third image and the second reference frame with increased brightness in the RGB format. Pixel values of the third image and the second reference frame with increased brightness in the RGB format may be processed, acquiring a second single-channel difference image in the RGB format. The weight of a pixel value in the second single-channel difference image may be determined. The third image and the second reference frame with increased brightness may be fused based on the weight, acquiring the fifth image.

It should be noted that the second reference frame with increased brightness and the third image may be fused based on the brightness, acquiring the fifth image, in the same way as fusing the fourth image and the second image, acquiring the second reference frame, details of which is not repeated.

FIG. 1H is a flowchart of a method for processing an image according to an example. In some embodiments, histogram matching may be performed on the second reference frame and the third image in the RGB format in a color channel, as follows, as shown in FIG. 1H.

In S107121, histogram equalization may be performed on the second reference frame in the RGB format, acquiring a first equalized image. Histogram equalization may be performed on the third image in the RGB format, acquiring a second equalized image.

In S107122, a first cumulative distribution function corresponding to the first equalized image and a second cumulative distribution function corresponding to the second equalized image may be determined.

In S107123, matching may be performed on the first cumulative distribution function and the second cumulative distribution function.

Here, a histogram may describe various things, such as a color distribution of an object, an edge gradient template of an object, and a probability distribution representing a present hypothesis of a target location. Specifically, a histogram reflects statistical information, which reflects the number of pixels in an image with pixel values falling within a specific range.

Through histogram matching, two images may be kept identical or as consistent as possible.

The second reference frame based on the RGB format may be taken as an input image. The third image in the RGB format in a histogram sequence may be taken as a target object. The input image may be converted, so that the gray histogram of the converted input image is as consistent with the target object as possible, thereby facilitating subsequent fusion processing.

Histogram equalization may be performed on the second reference frame in the RGB format and the third image in the RGB format, turning them into a normalized uniform histogram. The uniform histogram may serve as a medium, and histogram matching may be implemented by performing an inverse equalization operation on the second reference frame.

After acquiring the first equalized image and the second equalized image, a first cumulative distribution function corresponding to the first equalized image and a second cumulative distribution function corresponding to the second equalized image may be determined. The first cumulative distribution function and the second cumulative distribution function may be made equal to each other, acquiring an inverse transform function corresponding to the second cumulative distribution function. A matching result may be acquired according to the inverse transform function.

Here, a Cumulative Distribution Function (CDF) is an integral of a probability density function, and is capable of describing the probability distribution of a real random variable x.

The cumulative distribution function for all real numbers x is $F(x)=P(x \leq k)$ That is, the cumulative distribution function $F(x)$ represents the sum of the probabilities of occurrence of all discrete variables x less than or equal to k.

Then, after determining the first cumulative distribution function corresponding to the first equalized image and the second cumulative distribution function corresponding to the second equalized image based on a function feature of a cumulative distribution function, the grayscale values of the first equalized image and the second equalized image may be redistributed. For example, the grayscale values x1-x2 of a certain interval are mapped to a full grayscale range 0-255. In this way, the first cumulative distribution function and the second cumulative distribution function acquired may reach the same mapping range in terms of the grayscale, facilitating subsequent matching.

Here, matching may be performed on the first cumulative distribution function and the second cumulative distribution function, acquiring a matching image. The matching image is an image in the RGB format and has to be converted into the YUV format.

Matching may be performed on the first cumulative distribution function and the second cumulative distribution function, acquiring a matching image, as follows. The first cumulative distribution function and the second cumulative distribution function may be made to be equal to each other, acquiring the inverse transform function corresponding to the second cumulative distribution function. A matching result may be acquired according to the inverse transform function. In this way, since ghost elimination is performed using the first image with increased brightness (i.e., the fourth image) as the reference frame, and the first image is an image of low exposure, it is possible to significantly improve occurrence of a ghost in existence of a moving object in an overexposed region when ghost elimination is performed with normal exposure as the reference frame, effectively eliminating a ghost in the image. Further, the first image with increased brightness may retain more image details, improving loss of information during ghost elimination.

The present disclosure also provides embodiments as follows.

Figure 4:
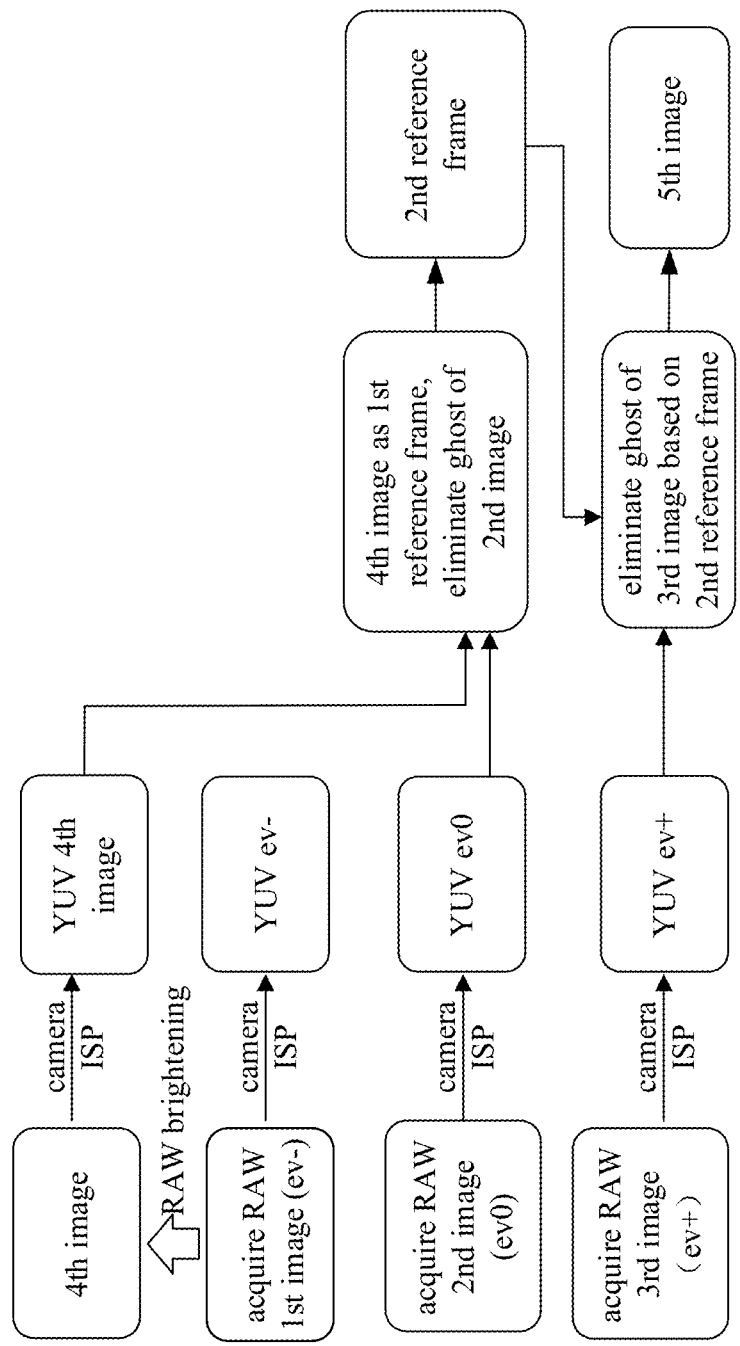
FIG. 4 is a flowchart of a method for processing an image according to an example.
Figure 5:
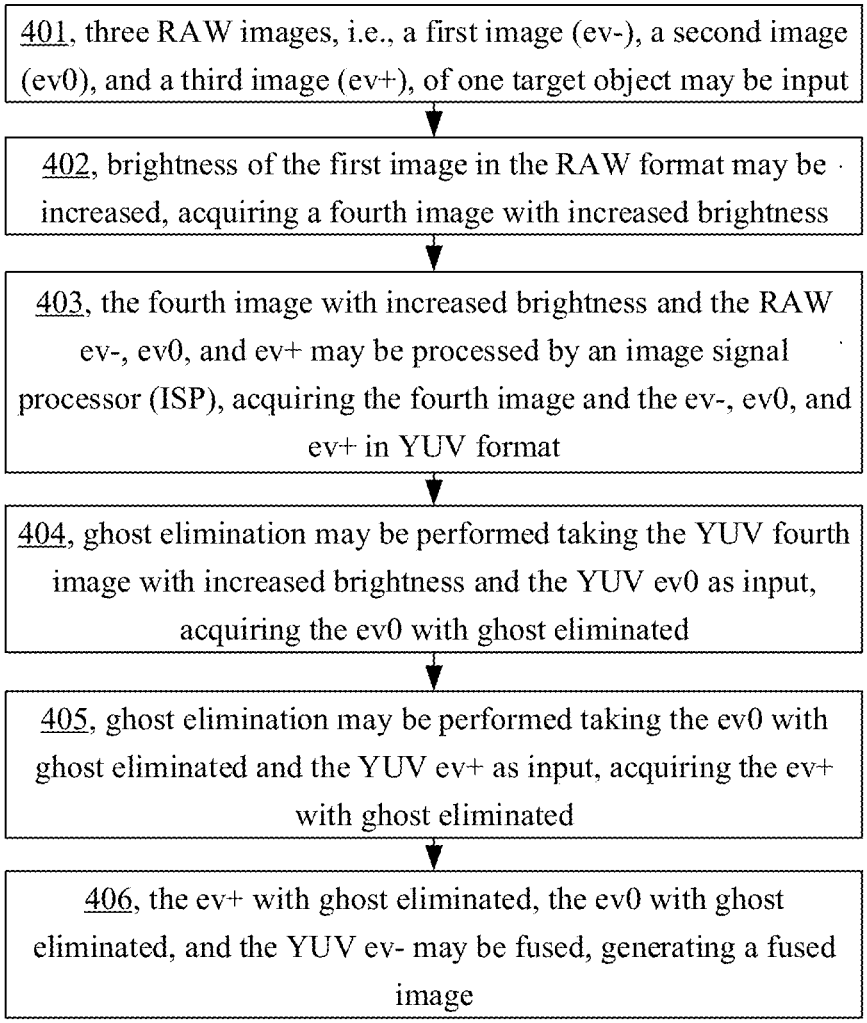
FIG. 5 is a flowchart of a method for processing an image according to an example.

FIG. 4, as well as FIG. 5, is a flowchart of a method for processing an image according to an example. As shown in FIG. 4 and FIG. 5, the method for processing an image may include a step as follows.

In S401, three RAW images, i.e., a first image (ev−), a second image (ev0), and a third image (ev+), of one target object may be input.

Here, the second image may be a normally exposed image ev0. The first image may be an underexposed image ev−. The third image may be a long-exposure image ev+.

In S402, brightness of the first image in the RAW format may be increased, acquiring a fourth image with increased brightness.

Here, brightness of the first image (ev−) may be increased in the RAW domain of the image.

The brightness increasing process may be as follows. Each pixel of the first image (ev−) may be multiplied by an adjustment coefficient x, acquiring the fourth image with increased brightness. The adjustment coefficient x may be as follows.

$$x = Gain_0 * ExpTime_0 / (Gain\_ * ExpTime\_)$$

The $ExpTime_0$ represents the exposure duration when collecting the second image. The $ExpTime\_$ represents the exposure duration when collecting the first image. The $Gain_0$ represents the gain of an image acquisition device that collects the second image. The $Gain\_$ represents the gain of an image acquisition device that collects the first image.

In In S403, the fourth image with increased brightness and the RAW ev−, ev0, and ev+ may be processed by an image signal processor (ISP), acquiring the fourth image and the ev−, ev0, and ev+ in the YUV format.

In S404, ghost elimination may be performed taking the YUV fourth image with increased brightness and the YUV ev0 as input, acquiring the ev0 with the ghost eliminated.

Here, the ev0 with the ghost eliminated may be the second reference frame in the embodiment.

In In S405, ghost elimination may be performed taking the ev0 with ghost eliminated and the YUV ev+ as input, acquiring the ev+ with ghost eliminated.

Here, the ev+ with ghost eliminated may be the fifth image in the embodiment.

In S406, the ev+ with ghost eliminated, the ev0 with ghost eliminated, and the YUV ev− may be fused, generating a fused image.

Here, if the motion regions of the ev+ with ghost eliminated, the ev0 with ghost eliminated, and the YUV ev− are the same, a ghost-eliminated image may be acquired by performing subsequent exposure fusion using the three images as input.

Thus, with the method for processing an image provided in embodiments of the present disclosure, after acquiring three images of a target object with different exposures, a fourth image is acquired by increasing brightness of the first image. Ghost elimination is performed on the second image using the fourth image as a reference frame. Then, ghost elimination is performed on the third image according to the second reference frame with ghost eliminated. In this way, since ghost elimination is performed using the first image with increased brightness (i.e., the fourth image) as the reference frame, and the first image is an image of low exposure, it is possible to significantly improve occurrence of a ghost in existence of a moving object in an overexposed region when ghost elimination is performed with normal exposure as the reference frame, effectively eliminating a ghost in the image. Further, the first image with increased brightness may retain more image details, improving loss of information during ghost elimination.

Figure 6A:
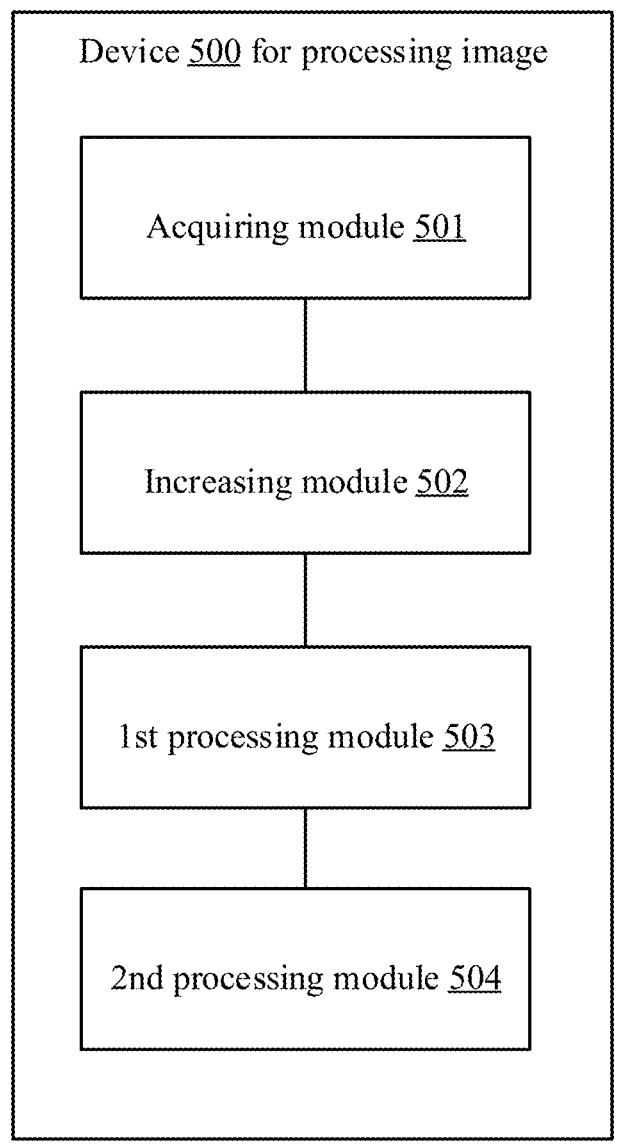
FIG. 6A is a diagram of a structure of a device for processing an image according to an example.

The present disclosure also provides a device for processing an image. FIG. 6A is a diagram of a structure of a device for processing an image according to an example. As shown in FIG. 6A, the device 500 for processing an image includes an acquiring module, an increasing module, a first processing module, and a second processing module.

The acquiring module 501 is configured to acquire a first image of a target object, a second image of the target object, and a third image of the target object. Exposure of the first image is less than exposure of the second image. The exposure of the second image is less than exposure of the third image.

The increasing module 502 is configured to increase brightness of the first image, acquiring a fourth image.

The first processing module 503 is configured to perform ghost elimination on the second image taking the fourth image as a first reference frame, acquiring a second reference frame.

The second processing module 504 is configured to perform ghost elimination on the third image based on the second reference frame, acquiring a fifth image.

Figure 6B:
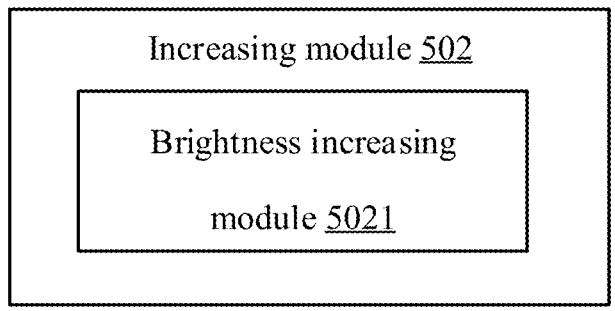
FIG. 6B is a diagram of a structure of an increasing module 502 according to an example.

FIG. 6B is a diagram of a structure of the increasing module according to an example. In some embodiments, the increasing module includes a brightness increasing module 5021.

The brightness increasing module may be configured to adjust the brightness of the first image, acquiring the fourth image with brightness differing from brightness of the second image by a difference less than a preset threshold.

Figure 6C:
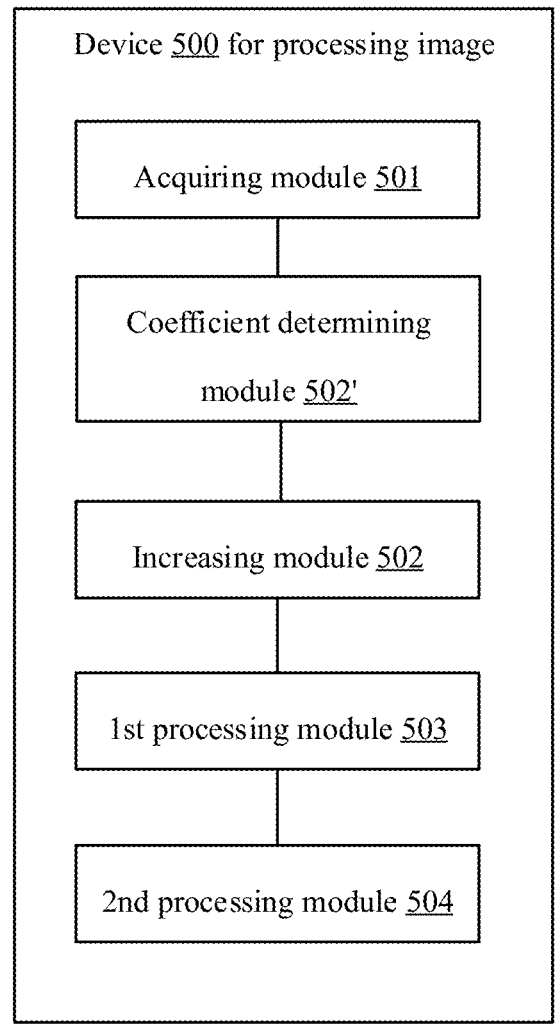
FIG. 6C is a diagram of a structure of a device for processing an image according to an example.

FIG. 6C is a diagram of a structure of a device for processing an image according to an example. In some embodiments, the device further includes a coefficient determining module 502'.

The coefficient determining module may be configured to determine an adjustment coefficient for adjusting the brightness of the first image according to exposure parameters of the first image and the second image. The exposure parameters may include exposure durations and/or exposure aperture sizes.

The increasing module may be further configured to increase the brightness of the first image according to the adjustment coefficient, acquiring the fourth image.

Figure 6D:
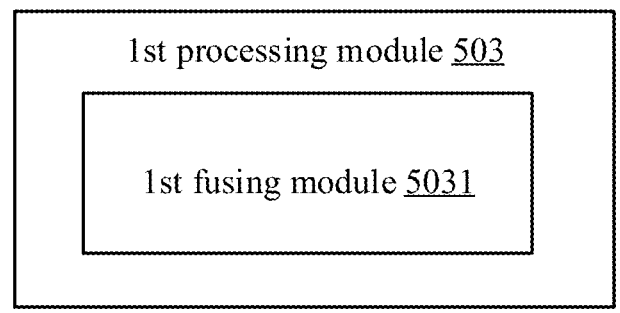
FIG. 6D is a diagram of a structure of a first processing module 503 according to an example.

FIG. 6D is a diagram of a structure of the first processing module according to an example. In some embodiments, the first processing module includes a first fusing module 5031.

The first fusing module may be configured to fuse the fourth image and the second image taking the fourth image as the first reference frame, acquiring the second reference frame. A location of the target object in the second reference frame may be identical to a location of the target object in the first image.

Figure 6E:
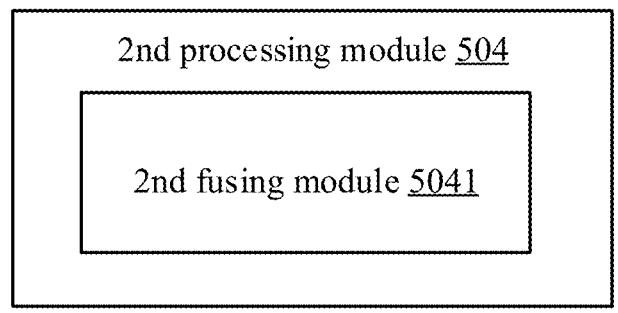
FIG. 6E is a diagram of a structure of a second processing module 504 according to an example.

FIG. 6E is a diagram of a structure of the second processing module according to an example. The second processing module may include a second fusing module 5041.

The second fusing module may be configured to fuse the second reference frame and the third image, acquiring the fifth image. A location of the target object in the fifth image may be identical to the location of the target object in the first image.

Figure 6F:
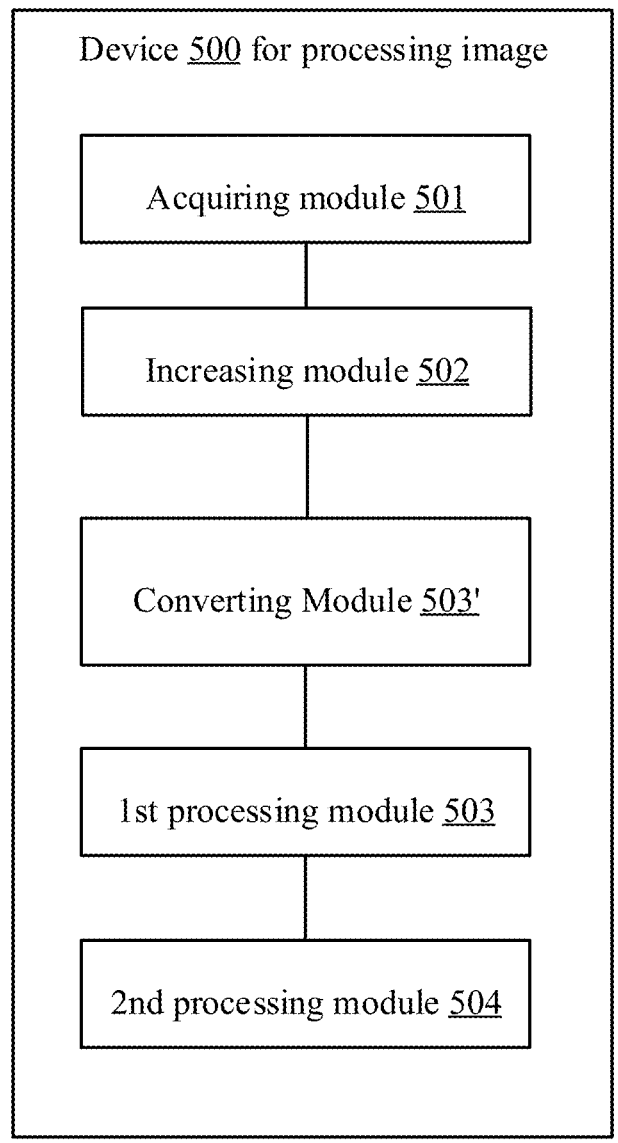
FIG. 6F is a diagram of a structure of a device for processing an image according to an example.

FIG. 6F is a diagram of a structure of a device for processing an image according to an example. In some embodiments, the device further includes a converting module 503'.

The converting module may be configured to perform format conversion on the first image, the second image, the third image, and the fourth image in a RAW format, acquiring the first image, the second image, the third image, and the fourth image in a YUV format.

Figure 6G:
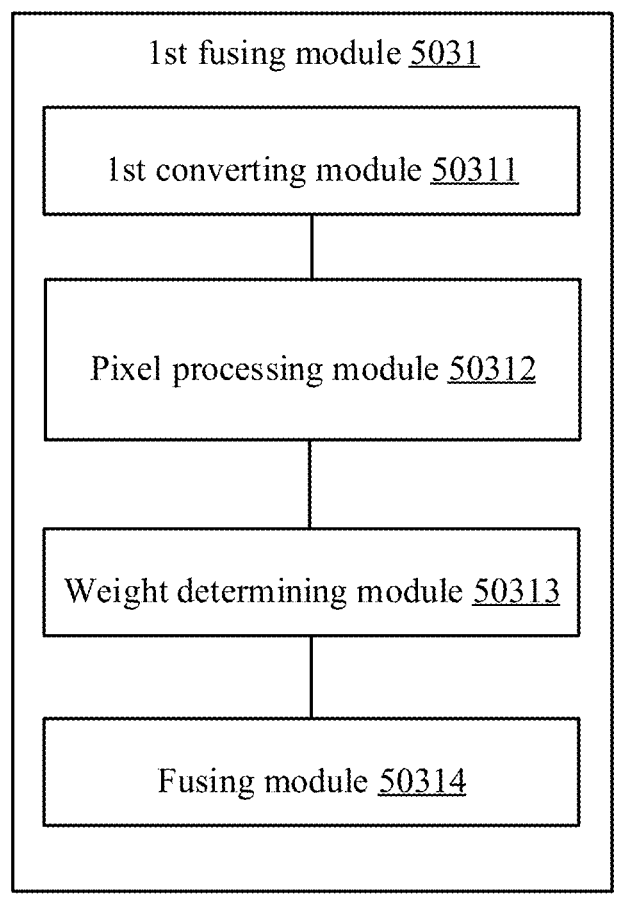
FIG. 6G is a diagram of a structure of a first fusing module 5031 according to an example.

FIG. 6G is a diagram of a structure of the first fusing module according to an example. The first fusing module may include a first converting module 50311, a pixel processing module 50312, a weight determining module 50313, and a fusing module 50314.

The first converting module may be configured to convert the fourth image and the second image in the YUV format into the fourth image and the second image in an RGB format.

The pixel processing module may be configured to process pixel values of the fourth image and the second image in the RGB format, acquiring a single-channel difference image in the RGB format.

The weight determining module may be configured to determine a weight of a pixel value in the single-channel difference image.

The fusing module may be configured to fuse the fourth image and the second image based on the weight, acquiring the second reference frame.

In some embodiments, the pixel processing module is further configured to implement:

performing subtraction operation on pixel values corresponding to a location in the fourth image and the second image in the RGB format, acquiring a three-channel difference image in the RGB format; and extracting a maximum channel value corresponding to a pixel value of the three-channel difference image, acquiring the single-channel difference image in the RGB format.

Figure 6H:
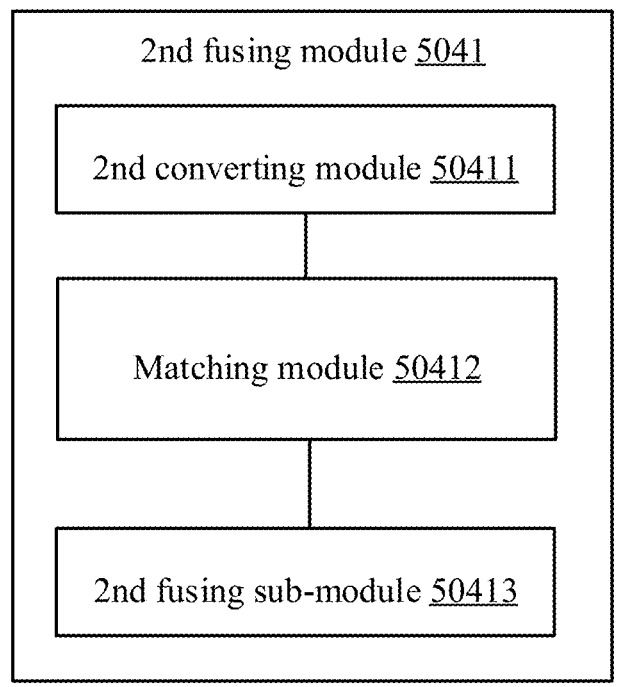
FIG. 6H is a diagram of a structure of a second fusing module 5041 according to an example.

FIG. 6H is a diagram of a structure of the second fusing module according to an example. In some embodiments, the second fusing module includes a second converting module 50411, a matching module 50412, and a second fusing sub-module 50413.

The second converting module may be configured to convert the second reference frame and the third image in the YUV format into the second reference frame and the third image in the RGB format.

The matching module may be configured to perform histogram matching on the second reference frame and the third image in the RGB format, and performing format conversion on a matching image, acquiring the second reference frame with increased brightness.

The second fusing sub-module may be configured to fuse the second reference frame with the increased brightness and the third image, acquiring the fifth image.

In some embodiments, the matching module is further configured to implement:

performing histogram equalization on the second reference frame in the RGB format, acquiring a first equalized image, and performing histogram equalization on the third image in the RGB format, acquiring a second equalized image;

determining a first cumulative distribution function corresponding to the first equalized image and a second cumulative distribution function corresponding to the second equalized image; and performing matching on the first cumulative distribution function and the second cumulative distribution function.

A module of a device according to an aforementioned embodiment may perform an operation in a mode elaborated in an embodiment of a method herein, which will not be repeated here.

Figure 7:
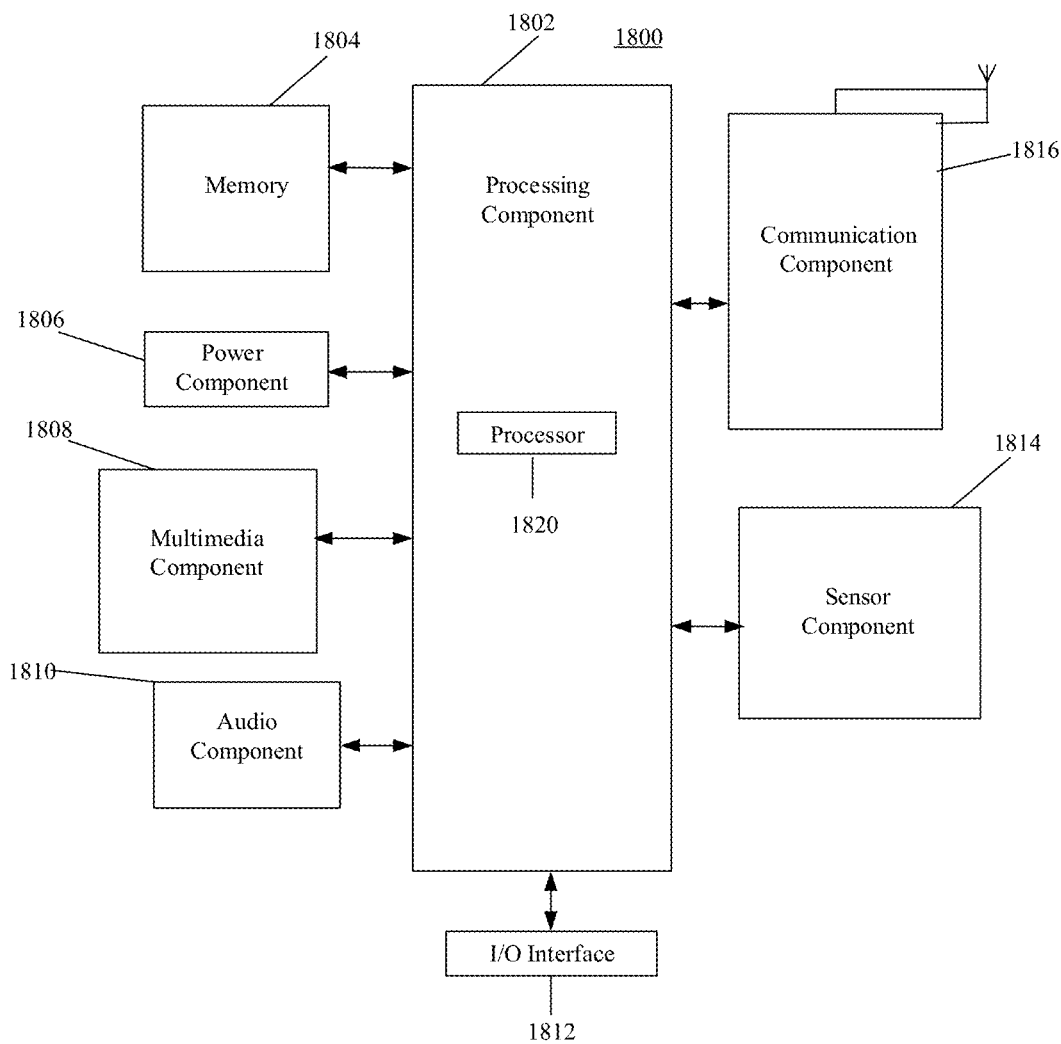
FIG. 7 is a block diagram of a device for processing an image according to an example.

FIG. 7 is a block diagram of a device 1800 for processing an image according to an example. For example, the device 1800 may be a mobile phone, a computer, a digital broadcasting terminal, a message transceiver, a game console, tablet equipment, medical equipment, fitness equipment, a Personal Digital Assistant (PDA), etc.

Referring to FIG. 7, the device 1800 may include one or more components as follows: a processing component 1802, a memory 1804, a power component 1806, a multimedia component 1808, an audio component 1810, an Input/Output (I/O) interface 1812, a sensor component 1814, and a communication component 1816.

The processing component 1802 generally controls an overall operation of the display equipment, such as operations associated with display, a telephone call, data communication, a camera operation, a recording operation, etc. The processing component 1802 may include one or more processors 1820 to execute instructions so as to complete all or some steps of the method. In addition, the processing component 1802 may include one or more modules to facilitate interaction between the processing component 1802 and other components. For example, the processing component 1802 may include a multimedia module to facilitate interaction between the multimedia component 1808 and the processing component 1802.

The memory 1804 is configured to store various types of data to support operation on the device 1800. Examples of these data include instructions of any application or method configured to operate on the device 1800, contact data, phonebook data, messages, images, videos, and/etc. The memory 1804 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 1806 supplies electric power to various components of the device 1800. The power component 1806 may include a power management system, one or more power supplies, and other components related to generating, managing and distributing electric power for the device 1800.

The multimedia component 1808 includes a screen providing an output interface between the device 1800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 1808 includes a front camera and/or a rear camera. When the device 1800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 1810 is configured to output and/or input an audio signal. For example, the audio component 1810 includes a microphone (MIC). When the device 1800 is in an operation mode such as a call mode, a recording mode, and a voice recognition mode, the MIC is configured to receive an external audio signal. The received audio signal may be further stored in the memory 1804 or may be sent via the communication component 1816. In some embodiments, the audio component 1810 further includes a loudspeaker configured to output the audio signal.

The I/O interface 1812 provides an interface between the processing component 1802 and a peripheral interface module. The peripheral interface module may be a keypad, a click wheel, a button, etc. These buttons may include but are not limited to: a homepage button, a volume button, a start button, and a lock button.

The sensor component 1814 includes one or more sensors for assessing various states of the device 1800. For example, the sensor component 1814 may detect an on/off state of the device 1800 and relative location of components such as the display and the keypad of the device 1800. The sensor component 1814 may further detect a change in the location of the device 1800 or of a component of the device 1800, whether there is contact between the device 1800 and a user, the orientation or acceleration/deceleration of the device 1800, and a change in the temperature of the device 1800. The sensor component 1814 may include a proximity sensor configured to detect existence of a nearby object without physical contact. The sensor component 1814 may further include an optical sensor such as a Complementary Metal-Oxide-Semiconductor (CMOS) or Charge-Coupled-Device (CCD) image sensor used in an imaging application. In some embodiments, the sensor component 1814 may further include an acceleration sensor, a gyroscope sensor, a magnetic sensor, a pressure sensor, or a temperature sensor.

The communication component 1816 is configured to facilitate wired or wireless/radio communication between the device 1800 and other equipment. The device 1800 may access a radio network based on a communication standard such as WiFi, 2G, 3G, . . . , or a combination thereof. In an example, the communication component 1816 broadcasts related information or receives a broadcast signal from an external broadcast management system via a broadcast channel. In an example, the communication component 1816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an example, the device 1800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an example, a non-transitory computer-readable storage medium including instructions, such as the memory 1804 including instructions, is further provided. The instructions may be executed by the processor 1820 of the device 1800 to implement an aforementioned method. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

A non-transitory computer-readable storage medium has stored therein instructions which, when executed by a processor, implement an aforementioned method.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

According to a first aspect of the present disclosure, there is provided a method for processing an image. The method includes:
  acquiring a first image of a target object, a second image of the target object, and a third image of the target object, exposure of the first image being less than exposure of the second image, the exposure of the second image being less than exposure of the third image;
  acquiring a fourth image by increasing brightness of the first image;
  acquiring a second reference frame by performing ghost elimination on the second image taking the fourth image as a first reference frame; and
  acquiring a fifth image by performing ghost elimination on the third image based on the second reference frame.

In some examples, acquiring the fourth image by increasing the brightness of the first image may include:
  adjusting the brightness of the first image and acquiring the fourth image with brightness differing from brightness of the second image by a difference less than a preset threshold.

In some examples, the method may further include: determining an adjustment coefficient for adjusting the brightness of the first image according to exposure parameters of the first image and the second image.

The exposure parameters may include exposure durations and/or exposure aperture sizes.

Acquiring the fourth image by increasing the brightness of the first image may include:
  acquiring the fourth image by increasing the brightness of the first image according to the adjustment coefficient.

In some examples, acquiring the second reference frame by performing ghost elimination on the second image and taking the fourth image as the first reference frame includes: acquiring the second reference frame by fusing the fourth image and the second image and taking the fourth image as the first reference frame.

A location of the target object in the second reference frame may be identical to a location of the target object in the first image.

Acquiring the fifth image by performing ghost elimination on the third image based on the second reference frame may include: acquiring the fifth image by fusing the second reference frame and the third image.

A location of the target object in the fifth image may be identical to the location of the target object in the first image.

In some examples, the method further includes:
  performing format conversion on the first image, the second image, the third image, and the fourth image in a RAW format, and acquiring the first image, the second image, the third image, and the fourth image in a YUV format.

Fusing the fourth image and the second image and taking the fourth image as the first reference frame, acquiring the second reference frame, may include:

converting the fourth image and the second image in the YUV format into the fourth image and the second image in an RGB format;

processing pixel values of the fourth image and the second image in the RGB format, and acquiring a single-channel difference image in the RGB format;

determining a weight of a pixel value in the single-channel difference image; and fusing the fourth image and the second image based on the weight, and acquiring the second reference frame.

In some examples, processing the pixel values of the fourth image and the second image in the RGB format, and acquiring the single-channel difference image in the RGB format includes:

performing subtraction operation on pixel values corresponding to a location in the fourth image and the second image in the RGB format, and acquiring a three-channel difference image in the RGB format; and extracting a maximum channel value corresponding to a pixel value of the three-channel difference image, and acquiring the single-channel difference image in the RGB format.

In some examples, fusing the second reference frame and the third image and acquiring the fifth image includes:

converting the second reference frame and the third image in the YUV format into the second reference frame and the third image in the RGB format;

performing histogram matching on the second reference frame and the third image in the RGB format, and performing format conversion on a matching image, acquiring the second reference frame with increased brightness; and fusing the second reference frame with the increased brightness and the third image, and acquiring the fifth image.

In some examples, performing histogram matching on the second reference frame and the third image in the RGB format in a color channel includes:

performing histogram equalization on the second reference frame in the RGB format, acquiring a first equalized image, performing histogram equalization on the third image in the RGB format, and acquiring a second equalized image;

determining a first cumulative distribution function corresponding to the first equalized image and a second cumulative distribution function corresponding to the second equalized image; and performing matching on the first cumulative distribution function and the second cumulative distribution function.

According to a second aspect of the present disclosure, there is provided a device for processing an image including a processor and a memory configured to store processor executable instructions. The processor is configured to implement any method of the first aspect when executing the executable instructions stored in the memory.

According to a third aspect of the present disclosure, there is provided a non-transitory computer-readable storage medium having stored therein computer-executable instructions which, when executed by a processor, implement steps in any method of the first aspect.

A technical solution provided by embodiments of the present disclosure may include beneficial effects as follows.

With the method for processing an image provided in embodiments of the present disclosure, after acquiring three images of a target object with different exposures, a fourth image is acquired by increasing brightness of the first image.

Ghost elimination is performed on the second image using the fourth image as a reference frame. Then, ghost elimination is performed on the third image according to the second reference frame with ghost eliminated. In this way, since ghost elimination is performed using the first image with increased brightness (i.e., the fourth image) as the reference frame, the motion region in which the target object is located may all be adjusted toward one side, rendering better effect of ghost elimination. During ghost elimination using normal exposure (the second image) as a reference frame, when a moving object exists in a long-burst region, a ghost still tends to occur due to a deviation in a direction of left-right adjustment. Thus, with the solution in the present disclosure, the ghost may be better eliminated. Further, the first image with increased brightness may retain more image details, improving loss of information during ghost elimination.

What is claimed is:

1. A method for processing an image, comprising:

acquiring a first image of a target object, a second image of the target object, and a third image of the target object, exposure of the first image being less than exposure of the second image, the exposure of the second image being less than exposure of the third image;

acquiring a fourth image by increasing brightness of the first image;

acquiring a second reference frame by performing ghost elimination on the second image and taking the fourth image as a first reference frame; and acquiring a fifth image by performing ghost elimination on the third image based on the second reference frame;

wherein acquiring the second reference frame by performing the ghost elimination on the second image and taking the fourth image as the first reference frame comprises:

acquiring the second reference frame by fusing the fourth image and the second image and taking the fourth image as the first reference frame, a location of the target object in the second reference frame being identical to a location of the target object in the first image;

wherein acquiring the fifth image by performing the ghost elimination on the third image based on the second reference frame comprises:

acquiring the fifth image by fusing the second reference frame and the third image, a location of the target object in the fifth image being identical to the location of the target object in the first image;

wherein the method further comprises:

acquiring the first image, the second image, the third image, and the fourth image in a YUV format by performing format conversion on the first image, the second image, the third image, and the fourth image in a RAW format, wherein acquiring the second reference frame by fusing the fourth image and the second image and taking the fourth image as the first reference frame further comprises:

converting the fourth image and the second image in the YUV format into the fourth image and the second image in an RGB format;

processing pixel values of the fourth image and the second image in the RGB format, and acquiring a single-channel difference image in the RGB format;

determining a weight of a pixel value in the single-channel difference image; and acquiring the second reference frame by fusing the fourth image and the second image based on the weight.

2. The method of claim 1, wherein acquiring the fourth image by increasing the brightness of the first image comprises:
   adjusting the brightness of the first image, and
   acquiring the fourth image with brightness differing from brightness of the second image by a difference less than a preset threshold.

3. The method of claim 1, further comprising:
   determining an adjustment coefficient for adjusting the brightness of the first image according to exposure parameters of the first image and the second image, the exposure parameters comprising exposure durations, exposure aperture sizes, or the exposure durations and exposure aperture sizes,
   wherein acquiring the fourth image by increasing the brightness of the first image comprises:
   acquiring the fourth image by increasing the brightness of the first image according to the adjustment coefficient.

4. The method of claim 1, wherein processing the pixel values of the fourth image and the second image in the RGB format, and acquiring the single-channel difference image in the RGB format comprises:
   performing subtraction operation on pixel values corresponding to a location in the fourth image and the second image in the RGB format, and acquiring a three-channel difference image in the RGB format; and
   extracting a maximum channel value corresponding to a pixel value of the three-channel difference image, and acquiring the single-channel difference image in the RGB format.

5. The method of claim 1, wherein acquiring the fifth image by fusing the second reference frame and the third image comprises:
   converting the second reference frame and the third image in the YUV format into the second reference frame and the third image in the RGB format;
   acquiring a matching image by performing histogram matching on the second reference frame and the third image in the RGB format, performing format conversion on the matching image, and acquiring the second reference frame with increased brightness; and
   acquiring the fifth image by fusing the second reference frame with the increased brightness and the third image.

6. The method of claim 5, wherein performing the histogram matching on the second reference frame and the third image in the RGB format in a color channel comprises:
   performing histogram equalization on the second reference frame in the RGB format, acquiring a first equalized image, performing histogram equalization on the third image in the RGB format, and acquiring a second equalized image;
   determining a first cumulative distribution function corresponding to the first equalized image and a second cumulative distribution function corresponding to the second equalized image; and
   performing matching on the first cumulative distribution function and the second cumulative distribution function.

7. A device for processing an image, comprising a processor and a memory,
   wherein the memory is configured to store executable instructions executable on the processor,
   wherein the processor is configured to execute the executable instructions to implement:
   acquiring a first image of a target object, a second image of the target object, and a third image of the target object, exposure of the first image being less than exposure of the second image, the exposure of the second image being less than exposure of the third image;
   acquiring a fourth image by increasing brightness of the first image;
   acquiring a second reference frame by performing ghost elimination on the second image and taking the fourth image as a first reference frame; and
   acquiring a fifth image by performing ghost elimination on the third image based on the second reference frame;
   wherein the processor is configured to implement acquiring the second reference frame by performing the ghost elimination on the second image and taking the fourth image as the first reference frame by:
   acquiring the second reference frame by fusing the fourth image and the second image and taking the fourth image as the first reference frame, a location of the target object in the second reference frame being identical to a location of the target object in the first image;
   wherein the processor is configured to implement acquiring the fifth image by performing the ghost elimination on the third image based on the second reference frame by:
   acquiring the fifth image by fusing the second reference frame and the third image, a location of the target object in the fifth image being identical to the location of the target object in the first image;
   wherein the processor is further configured to implement:
   acquiring the first image, the second image, the third image, and the fourth image in a YUV format by performing format conversion on the first image, the second image, the third image, and the fourth image in a RAW format,
   wherein the processor is further configured to implement acquiring the second reference frame by fusing the fourth image and the second image and taking the fourth image as the first reference frame by:
   converting the fourth image and the second image in the YUV format into the fourth image and the second image in an RGB format;
   processing pixel values of the fourth image and the second image in the RGB format, and acquiring a single-channel difference image in the RGB format;
   determining a weight of a pixel value in the single-channel difference image; and
   acquiring the second reference frame by fusing the fourth image and the second image based on the weight.

8. The device of claim 7, wherein the processor is configured to implement acquiring the fourth image by increasing the brightness of the first image by:
   adjusting the brightness of the first image, and
   acquiring the fourth image with brightness differing from brightness of the second image by a difference less than a preset threshold.

9. The device of claim 7, wherein the processor is further configured to implement:
   determining an adjustment coefficient for adjusting the brightness of the first image according to exposure parameters of the first image and the second image, the exposure parameters comprising exposure durations, exposure aperture sizes, or the exposure durations and exposure aperture sizes, wherein the processor is configured to implement acquiring the fourth image by increasing the brightness of the first image by:
acquiring the fourth image by increasing the brightness of the first image according to the adjustment coefficient.

10. The device of claim 7, wherein the processor is configured to implement processing the pixel values of the fourth image and the second image in the RGB format and acquiring the single-channel difference image in the RGB format by:
performing subtraction operation on pixel values corresponding to a location in the fourth image and the second image in the RGB format, and acquiring a three-channel difference image in the RGB format; and
extracting a maximum channel value corresponding to a pixel value of the three-channel difference image, and acquiring the single-channel difference image in the RGB format.

11. The device of claim 7, wherein the processor is configured to implement acquiring the fifth image by fusing the second reference frame and the third image by:
converting the second reference frame and the third image in the YUV format into the second reference frame and the third image in the RGB format;
acquiring a matching image by performing histogram matching on the second reference frame and the third image in the RGB format, performing format conversion on the matching image, and acquiring the second reference frame with increased brightness; and
acquiring the fifth image by fusing the second reference frame with the increased brightness and the third image.

12. The device of claim 11, wherein the processor is configured to implement performing the histogram matching on the second reference frame and the third image in the RGB format in a color channel by:
performing histogram equalization on the second reference frame in the RGB format, acquiring a first equalized image, performing histogram equalization on the third image in the RGB format, and acquiring a second equalized image;
determining a first cumulative distribution function corresponding to the first equalized image and a second cumulative distribution function corresponding to the second equalized image; and
performing matching on the first cumulative distribution function and the second cumulative distribution function.

13. A non-transitory computer-readable storage medium having stored therein computer-executable instructions which, when executed by a processor, implement:
acquiring a first image of a target object, a second image of the target object, and a third image of the target object, exposure of the first image being less than exposure of the second image, the exposure of the second image being less than exposure of the third image;
acquiring a fourth image by increasing brightness of the first image;
acquiring a second reference frame by performing ghost elimination on the second image and taking the fourth image as a first reference frame; and
acquiring a fifth image by performing ghost elimination on the third image based on the second reference frame;
wherein acquiring the second reference frame by performing the ghost elimination on the second image and taking the fourth image as the first reference frame comprises:
acquiring the second reference frame by fusing the fourth image and the second image and taking the fourth image as the first reference frame, a location of the target object in the second reference frame being identical to a location of the target object in the first image;
wherein acquiring the fifth image by performing the ghost elimination on the third image based on the second reference frame comprises:
acquiring the fifth image by fusing the second reference frame and the third image, a location of the target object in the fifth image being identical to the location of the target object in the first image;
wherein the method further comprises:
acquiring the first image, the second image, the third image, and the fourth image in a YUV format by performing format conversion on the first image, the second image, the third image, and the fourth image in a RAW format,
wherein acquiring the second reference frame by fusing the fourth image and the second image and taking the fourth image as the first reference frame further comprises:
converting the fourth image and the second image in the YUV format into the fourth image and the second image in an RGB format;
processing pixel values of the fourth image and the second image in the RGB format, and acquiring a single-channel difference image in the RGB format;
determining a weight of a pixel value in the single-channel difference image; and
acquiring the second reference frame by fusing the fourth image and the second image based on the weight.

14. The storage medium of claim 13, wherein acquiring the fourth image by increasing the brightness of the first image comprises:
adjusting the brightness of the first image, and
acquiring the fourth image with brightness differing from brightness of the second image by a difference less than a preset threshold.

15. The storage medium of claim 13, wherein when executed, the computer-executable instructions implement:
determining an adjustment coefficient for adjusting the brightness of the first image according to exposure parameters of the first image and the second image, the exposure parameters comprising exposure durations, exposure aperture sizes, or the exposure durations and exposure aperture sizes,
wherein acquiring the fourth image by increasing the brightness of the first image comprises:
acquiring the fourth image by increasing the brightness of the first image according to the adjustment coefficient.

* * * * *